July 8, 1941.    H. J. STEGEMAN    2,248,256
FLEXIBLE DRIVE
Filed July 2, 1940    2 Sheets-Sheet 1
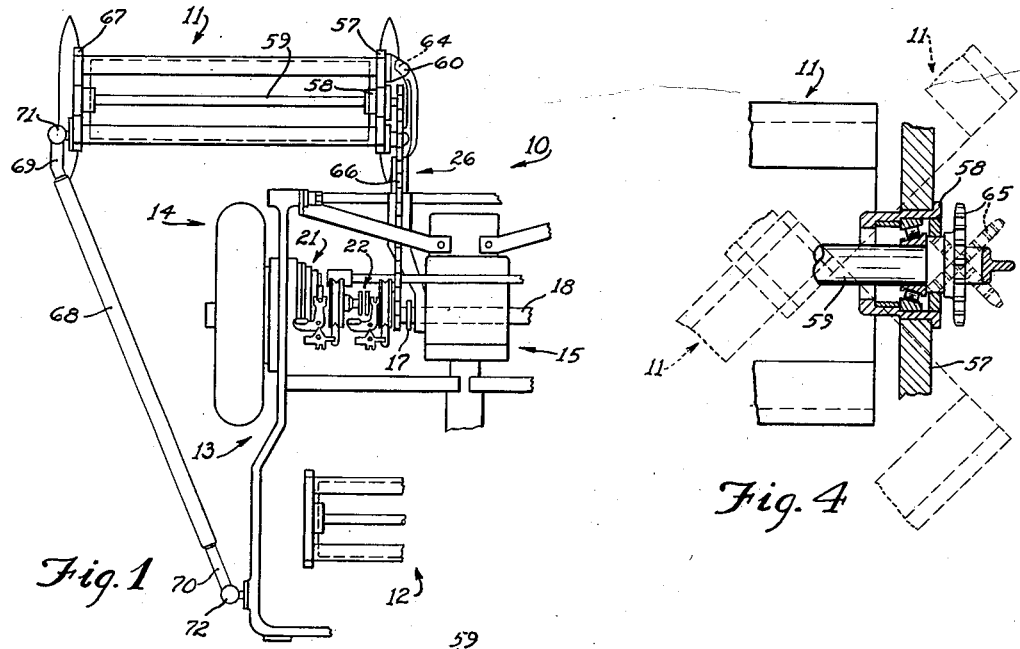
Fig. 1
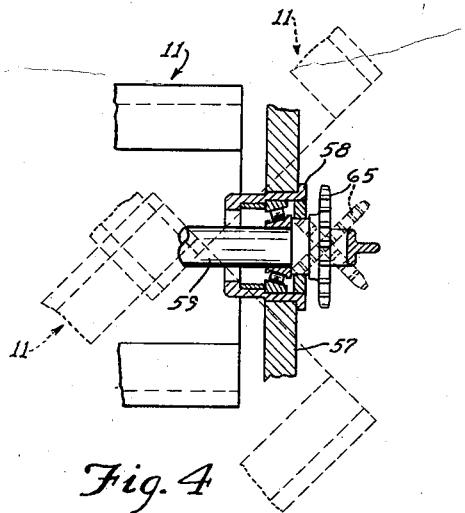
Fig. 4
Fig. 6
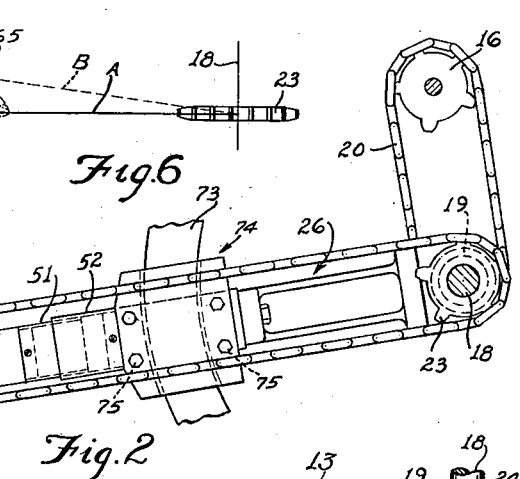
Fig. 2
Fig. 3
INVENTOR
HENRY J. STEGEMAN
BY John H. Hanrahan
ATTORNEY July 8, 1941.  H. J. STEGEMAN  2,248,256
FLEXIBLE DRIVE
Filed July 2, 1940  2 Sheets-Sheet 2
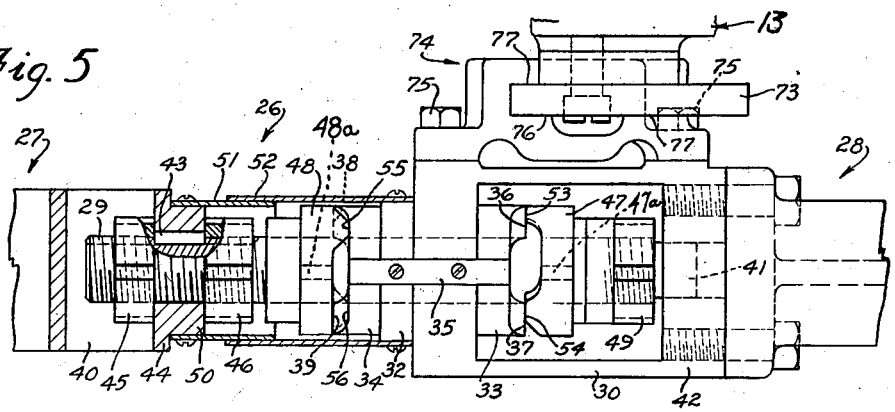
Fig. 5
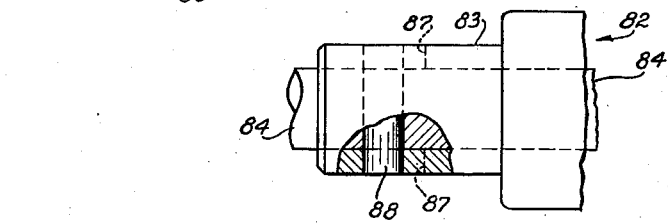
Fig. 7
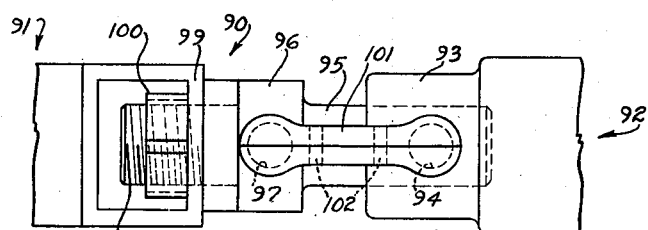
Fig. 8
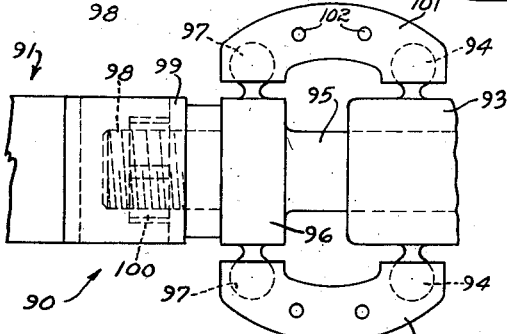
Fig. 9
Fig. 10
INVENTOR
HENRY J. STEGEMAN
BY
John H Hanrahan
ATTORNEY Patented July 8, 1941

2,248,256

UNITED STATES PATENT OFFICE 2,248,256

FLEXIBLE DRIVE

Henry J. Stegeman, Fairfield, Conn., assignor to The Locke Steel Chain Company, Bridgeport, Conn., a corporation of Connecticut Application July 2, 1940, Serial No. 343,633

15 Claims. (Cl. 74—228)

This invention relates to new and useful improvements in flexible power transmission devices the novel features of which will be best understood from the following description and annexed drawings, in which I have shown selected embodiments of the invention.

In the drawings—

Fig. 1 is a plan view of a portion of a power lawn mower having the invention incorporated therein;

Fig. 2 is a view on a larger scale showing in side elevation the distance link and driving means for the mounting and driving respectively, of a reel of the lawn mower;

Fig. 3 is a plan view on a yet larger scale and with parts broken away, showing the means of Fig. 2;

Fig. 4 is a detail sectional view taken as along the line 4—4 of Fig. 3;

Fig. 5 is an enlarged view of the cam means of Fig. 3 but in an adjusted position;

Fig. 6 is a more or less diagrammatic view illustrating the movement obtained by the cam means shown in Figs. 3 and 5;

Fig. 7 is a plan view with parts of a cover means broken away, showing a slightly modified form of cam means;

Fig. 8 is a view partly in section and partly in elevation and taken as looking from the lower side of Fig. 7;

Fig. 9 is a plan view showing a further modification; and

Fig. 10 is an elevational view taken as looking from the lower side of Fig. 9.

Referring in detail to the drawings and at first more particularly to Figs. 1 through 6 at 10 is generally indicated a portion of a power lawn mower and while the latter may include the desired number of cutting reels it is here disclosed as of a type employing three such reels although but two are indicated in the drawings. One reel in the drawings is generally designated 11 and a portion of the second reel is shown at 12 and it will be understood that any third reel would be a duplicate of the reel 11. A portion of the frame of the mower is shown at 13 and the latter is a wheeled construction, one wheel being shown in 14.

The driving motor 15 in any suitable manner drives a sprocket 16. Sprocket 16 is in substantial vertical alignment with a sprocket 17 secured on a shaft 18 for a portion of its length received in a tube or sleeve 19. An endless chain 20 trained over the sprockets 16 and 17 provides means whereby the former drives the latter and thus serves to rotate shaft 18. Through a pair of clutch means generally designated 21 and 22 respectively the wheels and reels of the mower are driven. A sprocket 23 is fast on and driven with shaft 18.

A mounting member 24 is turnable on the sleeve or tube 19 and bolts or similar means 25 serve to secure to said mounting member the inner or rear end of a distance link generally designated 26. Link 26 extends forwardly from the shaft 18 and comprises a forward part 27 and a rear part 28 which parts are connected by a shaft 29 in a manner and for a purpose to be described. Link part 28 includes a box-like portion 30 having a front wall 31 along the forward side of which is an annular projection 32. Disposed against the inner side of said wall is a cam 33 and a somewhat similar cam 34 is disposed against the forward side of the projection 32.

Cams 33 and 34 are disposed about the shaft 29 and are fixed to the link part 30 as by means of one or more keys 35. These cams face oppositely and the cam 33 is cut away at its opposite sides to provide high flat portions 36 and 37 the approaches to which are inclined while cam 34 is similarly cut to provide high flat portions 38 and 39. Obviously these cams are fixed to the link part 28 by the keys 35 and have no movement independent of said part.

Shaft 29 extends from a pocket-like portion 40 of the link part 27 and has its rear end 41 somewhat reduced and disposed in a recess in a rear wall 42 of the box-like portion 30 above mentioned. A key 43 locks the forward end portion of said shaft to the inner wall 44 of the link part 27 whereby said link part and shaft turn as a unit relative to the link part 28. Nuts 45 and 46 are threaded on the shaft and are provided with slots or grooves to be engaged by a spanner wrench or other tool and these nuts are tightened against opposite sides of the wall 44.

Fixed on the shaft 29 as by means of keys 47a and 48a are cams 47 and 48 arranged in opposing relation to the cams 33 and 34 respectively. A nut 49 threaded on the shaft serves to locate the cam 47 thereon. On the distance link wall portion 44 is an annular collar-like projection 50 to which is secured a tubular member 51 having telescoping relation with a somewhat similar member 52 fixed to the annular projection 32. Obviously the tubular telescoping members 51 and 52 will not interfere with movement of the distance link part 27 toward or from the part 28.

Cam 47 has opposite portions of its face cut away whereby to provide it with high flat surfaces 53 and 54 and the cam 48 is similarly treated to provide it with high flat faces 55 and 56. While the cams 47 and 48 are of the same or substantially the same construction they are disposed on the shaft 29 at approximately 90 degrees to one another so that when the high flat faces of cams 34 and 48 are in abutting relation as in Fig. 3 the high flat faces of the cam 47 are against the cut out portions of cam 33.

The foregoing describes the normal positions of the cams and it will be understood that on the distance line part 27 being turned about the axis of the shaft 29 the shaft turns with said part and the cams 47 and 48 turn with the shaft. Owing to the fact that the faces of the high portions of the cams are flat a certain amount of the described turning movement may take place in either direction without any longitudinal movement of the shaft. However, when sufficient turning movement occurs to carry the flat opposing high surface portions of the cam 48 off the corresponding portions of the cam 44 (see Fig. 5) the high flat surface portion of the cam 47 are carried up onto the corresponding portions of the cam 33.

In this way a longitudinal movement is imparted to the shaft 29 whereby the distance link part 27 moves toward the part 28. The above described operation takes place whenever the distance link part 27 is rocked a predetermined distance in either direction. Owing to the use of the double cam means disclosed there is a positive control at all times of the longitudinal movement of the shaft. When it turns excessively from normal position (that is, when its turning movement is sufficient to carry the high flat surface portions of cam 49 off the corresponding portions of cam 34) the high portions of cam 37 riding up onto the corresponding portions of cam 33 draw the shaft longitudinally toward the distance link part 28 and this movement of the shaft is controlled by the high portions of cam 48 riding downwardly on the inclined approaches to the high portions of cam 34.

As the shaft thereafter rocks back toward normal position the conditions are reversed and the cams 34 and 48 act to impart a reverse longitudinal movement to the shaft while the cams 33 and 47 control such movement. From this it will be seen that predetermined turning movement of the shaft will result in a steady positive longitudinal movement thereof and that such longitudinal movement is in proportion to the turning movement.

In my lawn mower the cam means described is used to compensate for the shortening of the effective length of a reel drive chain when one end of the reel tilts vertically either up or down, as the reel passes over an uneven or inclined piece of ground. A bearing plate 57 supports a bearing means 58 mounting the shaft 59 of the reel 11 and such plate is provided with a pair of U-shaped members 60 and 61 fast to the plate.

The ears of the member 61 receives between them a web 62 of the distance link part 27 and any suitable pivot means 63 passes through these parts and mounts the plate and thereby the reel 11 on such distance link. The outer free end portion 64 of distance link part 27 is received between the ears of the other clip whereby to guide the parts in any movement about the pivot 63.

On the reel shaft 59 is a sprocket 65 over which is trained an endless chain 66 trained also over the sprocket 23 above described. With this construction it will be clear that as the distance link part 27 may have a turning movement with the shaft 29 one end of the reel 11 may tilt upwardly and downwardly from a horizontal position. The broken line positions of Fig. 4 show that the reel 11 may tilt as much as 45 degrees in each direction from the horizontal and relative to the remainder of the machine.

The outer end of the reel 11 may have its shaft mounted by a bearing plate 67 and a link 68 is secured at its upper and lower ends to parts 69 and 70 having ball and socket connections 71 and 72 with the plate 67 and the mower frame 13 respectively. This ball and socket arrangement is provided to permit of independent movements of the reel 11 while at the same time the reel is supported.

With the described construction it will be understood that on slight tilting movements of the reel 11 the flat high surface portions of the cams 34 and 48 will remain in engagement since slight tilting movements of the sprocket 65 may take place without undue tightening of the drive chain 66. However, beyond that movement mentioned the double cam means described permits of movement of the distance link part 27 toward the part 28 and thus toward the sprocket 23. As sprocket 65 is tilted the effective length of the chain 66 is shortened due to twisting of the chain but this is compensated for by such sprocket moving toward the sprocket 23. Since the high portions of the cams have flat engaging surfaces in contact there would be no rapid wearing of the parts.

The movements described are diagrammatically illustrated in Fig. 6 wherein the sprockets 23 and 65 are shown their shafts 18 and 59 being illustrated by center lines only. By the full lines in said figure is illustrated the relation of the parts when the cutting reel 11 is horizontal. When the reel has tilted to dispose the sprocket 65 in the dotted line position the turning of the shaft 29 and the action of the cams 33, 34, 47 and 49 has resulted in the shifting of the center of sprocket 65 toward the sprocket 23 to an extent determined by the physical construction of the cams.

In such case the twisting of chain 66 has resulted in its pitch line being changed from that shown at A to that shown at B. Thus while the effective length of the chain is shortened by the twisting which takes place on rocking of the sprocket 65 the center distances between the sprocket 23 and 65 is changed in proportion to compensate. Therefore with the construction disclosed the reel 11 may tilt upwardly and downwardly as may be necessary to follow the contour of the area to be mowed and yet no undue tension, such as would result in rapid wear, is placed on the drive chain 66.

The distance link 26 may rock up and down since its inner end is turnable on the shaft 18 and to guide the link in any such movement a quadrant or arcuate strap-like member 73 is bolted or otherwise secured to the portion of the machine and a suitable casting 74 is secured to the linked portion 30 as by bolts 75 and has portions 76 and 77 slightly engaging opposite sides of the arcuate guide 73. In this manner provision is made for a guided or controlled movement of the distance link and parts carried thereby relative to the shaft 18.

Referring now to Figs. 7 and 8 the distance link there shown is generally designated 80 and includes a part 81 corresponding exactly with the part 27 above described and it also includes a relatively stationary part 82 (corresponding with part 28 above described) having a tubular extension 83 into which enters a portion of shaft 84. Said shaft is keyed or otherwise secured to the wall 85 of part 81 and is further held by the nuts 86.

The tubular extension 83 is provided in diametrically opposite parts with arcuate slots 87 and a pin 88 fast with and passing through the shaft 84 has its end portions disposed in said slots 87. Telescopic housing sections 89 and 90 are provided to enclose the pin and slot part whereby to exclude dust, grass clippings and the like. With the described construction it will be clear that if the distance link part 81 is turned for up or down tilting of the cutting reel the ends of the pin 88 will move in the arcuate or cam slots 87 whereby the shaft 84 and part 81 will have longitudinal movement imparted to them.

Normally when the reel is horizontal the relation of the pin to the slots is that shown in Fig. 7 and it will be clear since the part 82 is stationary (that is, it is not turnable about its longitudinal axis) and since both end portions of the slots extend forwardly any turning of the shaft from the position of Fig. 7 will result in the pin riding rearwardly on the forward wall of the slots 87. Thereafter on reverse movement of the shaft the pin will ride forwardly on the rear walls of the slots.

Figs. 9 and 10 show yet another modification wherein the distance link generally designated 90 includes the part 91 corresponding with the part 27 first described and further includes a relatively stationary part 92 corresponding with the part 28 first described. Part 92 includes a tubular extension 93 secured to or formed with which are balls 94. Fast with the part 91 and with a shaft 95, which may be keyed or otherwise secured to said part, is an annular portion 96 provided externally at diametrically opposite points with balls 97.

As here shown portion 96 is integral with shaft 95 and the latter includes a threaded extension 98 passing through the wall 99 of part 91 and inwardly of said wall having a nut 100 threaded thereon. A pair of links 101 connect the balls 94 with the balls 97 and such links as shown may each comprise a pair of parts having complemental portions providing sockets for said balls and which pair of parts are secured together by rivets or the like 102.

With this construction turning of the part 91 and the shaft 95 relative to the part 92 will result in movement of the links 101 from their normal relations wherein they are parallel with the shaft 95. The link ends receiving the balls 97 will be shifted carrying the links into inclined positions as the links rock about the balls 94 as pivots. This results in a shortening of the effective lengths of the links so that the shaft 95 will move further inwardly in the member 92. Obviously such movement will result in the reel and sprocket (not shown) carried by the part 91 being shifted toward the part 92 so as to compensate for any twisting of the endless driving connection to such sprocket all as described in connection with Figs. 1 through 6.

Having thus set forth the nature of my invention what I claim is:

1. In combination, a pair of substantially parallel shafts, a driving element on one of said shafts, a driven element on the other of said shafts, an endless driving means disposed over said elements for rotating one from the other thereof, means mounting one of said shafts for tilting movement in opposite directions substantially in its own plane about an axis transverse of said shaft, means mounting said tiltable shaft for bodily movement toward the other shaft, and means to impart such latter movement to the tiltable shaft on tilting thereof about such transverse axis whereby to lessen the center distance between said elements and compensate for the shortening of the effective length of said driving means as the latter is twisted on the described tilting of the shaft.

2. In combination, a pair of substantially parallel shafts, a sprocket on each of said shafts, an endless chain trained over said sprockets, means mounting one of said shafts for tilting movement about an axis transverse to said shaft, means mounting said tiltable shaft for bodily movement toward the other shaft, and means to impart said last movement only on a predetermined tilting of said tiltable shaft about said transverse axis to lessen the center distance between said sprockets and thus compensate for the lessening of the effective length of said chain due to twisting of the latter as the tiltable shaft is tilted about said transverse axis.

3. In combination, a pair of substantially parallel shafts, a driving element on one of said shafts, a driven element on the other of said shafts, and endless driving means disposed over said elements for rotating one from the other thereof, means mounting one of said shafts for tilting movement in its own plane and about an axis transverse to the shaft, means mounting said tiltable shaft for movement bodily toward the other shaft, and positively acting means to impart such latter movement to the tiltable shaft on tilting thereof about said transverse axis whereby to lessen the center distance between said elements and compensate for the shortening of the effective length of said driving means as the latter is twisted on such tilting of the shaft.

4. In combination, a pair of substantially parallel shafts, a sprocket on each of said shafts, an endless chain trained over said sprockets, means mounting one of said shafts for tilting movement about an axis transverse to the shaft, means mounting said tiltable shaft for bodily movement toward the other shaft, and cam means to impart said last movement at a predetermined rate in proportion to the degree of tilting of said tiltable shaft to lessen the center distance between said sprockets and thus compensate for the lessening of the effective length of said chain due to twisting of the latter as the tiltable shaft is tilted about said transverse axis.

5. In combination, a pair of substantially parallel shafts, a sprocket on each of said shafts, an endless chain trained over said sprockets, means mounting one of said shafts for tilting movement about an axis transverse of the shaft, means mounting said tiltable shaft for bodily movement toward the other shaft, and cam means to impart said last movement at a predetermined rate in proportion to the degree of tilting of said tiltable shaft to lessen the center distance between said sprockets and thus compensate for the lessening of the effective length of said chain due to twisting of the latter as the tiltable shaft is tilted about said transverse axis, said last means including a pair of opposing cams having normally engaging flat surfaces whereby said tiltable shaft is not moved in the direction of the other shaft except on predetermined tilting of the tiltable shaft to carry said flat cam surfaces out of engagement.

6. In combination, a pair of parallel shafts, a driving element on one of said shafts, a driven element on the other of said shafts, a distance link movable about one of said shafts and mounting the other shaft for rocking movement in its own plane about its transverse axis, an endless driving means trained over said elements, and said distance link including means for moving one of said shafts and its element toward the other shaft and its element a distance depending on the degree of tilt of the rockable shaft to lessen the center distance between the elements and thereby compensate for shortening of said endless driving means as the latter is twisted on the described rocking of the distance link mounted shaft.

7. In a power lawn mower, a driven shaft, a distance link including a pair of parts of which one is movable about said shaft, means mounting one end of a cutter reel shaft on the other of said parts, a sprocket on said cutter reel shaft, a sprocket on said driven shaft, an endless driving chain trained over said sprockets, a shaft disposed at right angles to said driven and reel shafts and connecting the two parts of said distance link whereby one part of the latter is turnable relative to the other part thereof to permit of one end of said reel tilting upwardly and downwardly, and double cam means associated with the third mentioned shaft and operable to shift the same longitudinally to move the one part of the distance length and thereby the reel shaft carried sprocket toward the driven shaft carried sprocket to lessen the center distance between the sprockets and thus compensate for the shortening of the effective length of said chain resulting from the twisting thereof as the one end of the reel is tilted.

8. In a power lawn mower, a driven shaft, a distance link including a pair of parts of which the one is movable about said shaft, means mounting one end of a cutter reel shaft on the other of said parts, a sprocket on said cutter reel shaft, a sprocket on said driven shaft, an endless driving chain trained over said sprockets, a shaft disposed at right angles to said driven and reel shafts and connecting the two parts of said distance link whereby one part of the latter is turnable relative to the other part thereof to permit one end of said reel tilting upwardly and downwardly, cam means associated with the third mentioned shaft and operable to shift the same longitudinally to move one part of the distance link and thereby the reel shaft carried sprocket toward the driven shaft carried sprocket to lessen the center distance between the sprockets and thus compensate for the shortening of the effective length of said chain resulting from the twisting thereof as the one end of the reel is tilted, and said cam means including means preventing such compensating movement of the reel carriage shaft except on substantial tilting of said reel.

9. In a power lawn mower, a driven shaft, a cutter reel including a shaft, driving elements on each of said shafts, a flexible endless driving means trained over both of said elements, means mounting said reel for tilting movement about an axis transverse to the longitudinal axis of the reel, and means mounting one of said elements for positive movement toward the other thereof for a distance depending on the degree of tilting of said reel whereby to prevent excessive tightening of said endless driving means on twisting thereof due to tilting movement of the reel shaft carried driving element with the reel on tilting of the latter.

10. In combination, a pair of substantially parallel shafts, a sprocket on each of said shafts, an endless chain trained over said sprockets, means mounting one of said shafts for tilting movement about an axis transverse to the axis of the shaft, means mounting said tiltable shaft for movement toward the other shaft, cam means controlling said last movement whereby it takes place at a predetermined rate depending on the degree of tilting of said tiltable shaft to lessen by a predetermined amount the center distance between said sprockets and thus compensate for the lessening of the effective length of said chain due to twisting of the latter as the tiltable shaft is tilted, said last means including a tubular member having a cam slot therein and a shaft turnable in said member, and a pin rigid with said shaft and extending into said cam slot and by engagement with the walls of the latter during turning of the shaft controlling movement of the shaft into and out of the tubular member.

11. In combination, a pair of parallel shafts, a driving element on one of said shafts, a driven element on the other of said shafts, a distance link movable about one of said shafts and mounting the other shaft for rocking movement in its own plane about its transverse axis, an endless driving means trained over said elements, said distance link including a pair of members, a shaft carried by one of said members and entering a recess in the other member whereby the members are relatively turnable, links disposed at the outer sides of and pivotally connected at their respective ends with the respective members whereby as turning movement takes place between the members with the third shaft as an axis said shaft is drawn into said recess and the members moved toward one another a distance determined by the degree of said turning movement thereby lessening the center distance between the parallel shafts and their driving elements whereby to avoid undue tension on said endless driving means when the latter is twisted on the rocking of one of said parallel shafts.

12. In combination, a pair of substantially parallel shafts, a sprocket on each of said shafts, an endless chain trained over said sprockets, means mounting one of said shafts for tilting movement, means mounting said tiltable shaft for limited movement toward the other shaft on a predetermined tilting of said tiltable shaft to lessen the center distance between said sprockets and thus compensate for the lessening of the effective length of said chain due to twisting of the latter as the tiltable shaft is tilted, said last means including a pair of members of which one mounts said tiltable shaft, a shaft carried by one of said members and entering a recess in the other member whereby the members are relatively turnable, links disposed at the outer sides of and pivotally connected at their respective ends with the respective members whereby as turning movement takes place between the members with the third shaft as an axis said shaft is drawn into said recess and the members moved toward one another lessening the center distance between the parallel shafts and their driving elements whereby to compensate for shortening of and avoid excessive tension on the endless driving means when the latter is twisted on the rocking of one of said parallel shafts.

13. In combination, a pair of substantially parallel shafts, a sprocket on each of said shafts, an endless chain trained over said sprockets, means mounting one of said shafts for tilting movement about its transverse axis and for bodily movement toward the other shaft, and positive means to impart said last movement only on tilting movement of said tiltable shaft about its said transverse axis.

14. In combination, a pair of substantially parallel shafts, a driving element on one of said shafts, a driven element on the other shaft, an endless driving means disposed over said elements for driving one from the other, means mounting one of said shafts for tilting movement and for bodily movement toward the other shaft, and positive means to impart the latter movement to the tiltable shaft on tilting thereof.

15. In combination, a pair of substantially parallel shafts, and endless driving means driving one of said shafts from the other thereof, means mounting said shafts for relative bodily movement to lessen their center distance, means mounting one of said shafts for tilting movement, and means positively controlling said relative bodily movement on said tilting movement taking place.

HENRY J. STEGEMAN.